United States Patent Office 3,284,220
Patented Nov. 8, 1966

3,284,220
STABILIZED POLYMER COMPOSITIONS CONTAINING NAPHTHOIC ACID ESTERS
Constantine E. Anagnostopoulos, Kirkwood, Mo., and Aubert Y. Coran, Charleston, W. Va., assignors to Monsanto Company, a corporation of Delaware
No Drawing. Filed June 15, 1962, Ser. No. 202,679
31 Claims. (Cl. 106—178)

The present invention relates to improved organic materials and more particularly deals with highly polymeric substances such as are employed in the manufacture of molding and extruding compositions, films, sheets, textiles, papers, surface or coating compositions, impregnating agents, solid foams, rubbers, etc. More particularly, this invention relates to compositions comprising such highly polymeric substances in combination with an adjuvant which has the property of stabilizing the properties of the polymer against the degradative effects of ultraviolet light.

In accordance with this invention, it has been found that the properties of a polymer, selected from the class consisting of natural and synthetic, linear and cross-linked polymers, are improved by incorporating therein a stabilizing amount of a compound of the formula

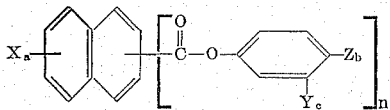

wherein:
$a$ is an integer from 0 to 2;
X is selected from the group consisting of chlorine, bromine, alkyl of 1 to 18 carbon atoms, and alkoxy of 1 to 18 carbon atoms;
$n$ is an integer from 1 to 4;
$b$ and $c$ are unlike integers selected from 0 to 1;
Y is selected from the group consisting of alkoxy of 1 to 18 carbon atoms, and phenoxy; and
Z is selected from the group consisting of alkyl of 1 to 24 carbon atoms, phenyl, and

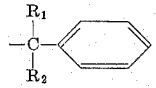

where $R_1$ and $R_2$ are alkyl of 1 to 4 carbon atoms.

The alkyl substituents represented by X and Z can be either straight or branched alkyl chains; e.g., methyl, ethyl, n-propyl, isopropyl, n-butyl, isobutyl, sec.-butyl, t-butyl, n-amyl, isoamyl, n-hexyl, 1,1-dimethylbutyl, isoheptyl, n-octyl, 2-ethylhexyl, 1,1,3,3-tetramethylbutyl, n-nonyl, isodecyl, undecyl, dodecyl, tetradecyl, pentadecyl, hexadecyl, and octadecyl. In the case of the alkyl substituents represented by Z, there are also included eicosyl, heneicosyl, docosyl, tricosyl, tetracosyl, and the like.

The alkoxy substituents represented by both X and Y can also be either straight or branched chains; e.g., methoxy, ethoxy, propoxy, isopropoxy, n-butoxy, t-butoxy, isopentyloxy, hexyloxy, 1-methylpentyloxy, isoheptyloxy, octyloxy, 2-ethylhexloxy, nonyloxy, decyloxy, dodecyloxy, tridecyloxy, tetradecyloxy, pentadecyloxy, heptadecyloxy, and octadecyloxy.

The alkyl substituents represents by $R_1$ and $R_2$ are the lower alkyls, such as methyl, ethyl, n-propyl, isopropyl, n-butyl, and isobutyl.

Illustrative examples of specific naphthoic acid esters contemplated by the foregoing formula are:

3-methoxyphenyl 1-naphthoate,
4-ethylphenyl 1-naphthoate,
4-t-butylphenyl 1-naphthoate,
4-isodecylphenyl 1-naphthoate,
4-t-butylphenyl 2-chloro-1-naphthoate,
4-octadecylphenyl 5-bromo-1-naphthoate,
4-isoamylphenyl 4-methoxy-1-naphthoate,
3-octyloxyphenyl 1-naphthoate,
4-α-cumylphenyl 1-naphthoate,
4-isooctylphenyl 5-chloro-6-methoxy-1-naphthoate,
3-(1,1-dimethylbutoxy)phenyl 1-naphthoate,
3-isopropoxyphenyl 4-n-decyloxy-1-naphthoate,
4-tricosylphenyl 3,6-di-t-butyl-1-naphthoate,
4-(1,1,3,3-tetramethylbutyl-phenyl 1-naphthoate,
3-hexadecyloxyphenyl 1,6-dibromo-1-naphthoate,
4-nonylphenyl 4-methoxy-1-methyl-1-naphthoate
4-n-butylphenyl 2-naphthoate,
4-ethylphenyl 2-naphthoate,
3-t-butoxyphenyl 4-chloro-2-naphthoate,
4-phenylphenyl 2-naphthoate,
3-octadecycloxyphenyl 6-hexyl-2-naphthoate,
4-α-cumylphenyl 1,6-dibromo-2-naphthoate,
4-tetracosylphenyl 2-naphthoate,
p-tolyl 5-chloro-6-nonyloxy-2-naphthoate,
4-dodecylphenyl 3,7-dimethoxy-2-naphthoate,
3-phenoxyphenyl 2-naphthoate,
4-t-butylphenyl 4-dodecyl-2-naphthoate,
4-(1-ethyl-1-methylpentyl)phenyl 2-naphthoate,
3-isohexyloxyphenyl 6-methoxy-5-methyl-2-naphthoate,
4-nonylphenyl 5-bromo-6-hexadecyloxy-2-naphthoate,
3-decyloxyphenyl 3,7-dichloro-2-naphthoate,
4-(1,1,3,3-tetramethylbutyl)phenyl 2-naphthoate,
bis-(p-tolyl) naphthalene-1,2-dicarboxylate,
bis-(4-t-butylphenyl) naphthalene-1,3-dicarboxylate,
bis-(3-dodecyloxyphenyl) naphthalene-1,4-dicarboxylate,
bis-(4-isooctylphenyl) naphthalene-1,5-dicarboxylate,
bis-(3-ethoxyphenyl) naphthalene-1,6-dicarboxylate,
bis-(4-octadecylphenyl) naphthalene-1,7-dicarboxylate,
bis-(4-docosylphenyl)naphthalene-1,8-dicarboxylate,
bis-(3-phenoxyphenyl)naphthalene-2,3-dicarboxylate,
bis-(3-nonyloxyphenyl)naphthalene-2,6-dicarboxylate,
bis-(4-isopropylphenyl)naphthalene-2,7-dicarboxylate,
bis-(4-n-butylphenyl)4-methylnaphthalene-1,2-dicarboxylate,
bis-(4-α-cumylphenyl)5-methylnaphthalene-1,2-dicarboxylate,
bis-(3-hexadecyloxyphenyl)4,7-dimethylnaphthalene-1,2-dicarboxylate,
bis-(4-isoamylphenyl)6-methoxy-3-methylnaphthalene-1,2-dicarboxylate,
bis-[4-(1,1-dimethylpentyl)phenyl]4-methoxynaphthalene-1,3-dicarboxylate,
bis-(3-isopropoxyphenyl)6-bromo-4-methoxy-naphthalene-1,3-dicarboxylate,
bis-(3-phenoxyphenyl)6-chloro-4-methoxy-naphthalene-1,3-dicarboxylate,
bis-(4-ethylphenyl)3,6-diisopropylnaphthalene-1,4-dicarboxylate,
bis-[4-(1,1,3,3-tetramethylbutyl)phenyl]4,8-dichloro naphthalene-1,5-dicarboxylate,
bis-(4-nonylphenyl)1-chloronaphthalene-2,3-dicarboxylate,
bis-(3-heptyloxyphenyl)1,4-dimethoxynaphthalene-2,3-dicarboxylate,
bis-(4-beneicosylphenyl)3,6-dimethoxynaphthalene-2,7-dicarboxylate,
tris-(4-t-butylphenyl)naphthalene-1,2,3-tricarboxylate,
tris-(3-methoxyphenyl)naphthalene-1,2,3-tricarboxylate,
tris-(4-nonylphenyl)naphthalene-1,2,5-tricarboxylate,
tris-(4-octadecylphenyl)naphthalene-1,2,8-tricarboxylate, tris-[4-(1,1-dimethylpropyl)phenyl]naphthalene-1,3,6-tricarboxylate,
tris-(3-decyloxyphenyl)naphthalene-1,3,8-tricarboxylate,
tris-(4-phenylphenyl)naphthalene-1,4,5-tricarboxylate,
tris-(3-phenoxyphenyl)naphthalene-1,4,5-tricarboxylate,
tris-(4-α-cumylphenyl)4,7-dimethylnaphthalene-1,3,6-tricarboxylate,
tris-(p-tolyl)5,6-dichloronaphthalene-1,2,3-tricarboxylate,
tris-(3-n-butoxyphenyl)4-methoxynaphthalene-1,2,8-tricarboxylate,
tetra-(4-ethylphenyl)naphthalene-1,2,3,4-tetracarboxylate,
tetra-(3-isopropoxyphenyl)naphthalene-1,2,4,5-tetracarboxylate,
tetra-(3-octyloxyphenyl)naphthalene-1,4,5,8-tetracarboxylate,
tetra-(4-t-butylphenyl)naphthalene-2,3,6,7-tetracarboxylate,
tetra-(4-pentadecylphenyl)2-chloronaphthalene-1,4,5,8-tetracarboxylate,
tetra-(4-n-hexylphenyl)2-methoxynaphthalene-1,4,5,8-tetracarboxylate, and
tetra-[4-(1-methyl-1-ethylpentyl)phenyl]2,6-dichloronaphthalene-1,4,5,8-tetracarboxylate.

The naphthoic acid esters employed in this invention can be prepared by reacting a halide of a naphthalene mono- or polycarboxylic acid with an appropriate substituted phenol such as a para-alkylphenol or a meta-alkoxyphenol.

Specific examples of substituted phenols which are employed in the preparation of such esters are p-cresol, 4-t-butylphenol, 4-t-amylphenol, 4 - (1,1,3,3 - tetramethylbutyl)phenol, 4-(1-ethyl - 1 - methylpentyl)phenol, 4-α-cumylphenol, 3-methoxyphenol, 3-butoxyphenol, 3-octadecoxyphenol, 3 - phenoxyphenol, and the like. Other substituted phenols which are used are those produced by the reaction of phenol with a tertiary alkyl halide or with a mixture of such alkyl halides. Phenol is also reacted with branched chain olefins or mixtures thereof to produce the substituted phenols. The olefins which are employed are those wherein there is at least one branch on one of the carbon atoms of a double bond, as in the case of isobutylene and dissobutylene. The position of the unsaturation is generally immaterial, and one can employ alpha olefins as well as olefins in which the double bond is remotely disposed with respect to the terminal carbon atoms.

The polymers of propylene having a total number of carbon atoms of from 6 to 24, and the polymers of butylene having a total number of carbon atoms of from 8 to 24, are generally well suited for the preparation of the alkylphenols which are useful in the preparation of the compounds of this invention. For example, one can employ propylene dimer, propylene trimer, propylene tetramer, propylene pentamer, propylene hexamer, propylene octamer, isobutylene dimer, butylene trimer, butylene tetramer, butylene pentamer, etc. The alkylphenols which are derived from propylene polymers having from 6 to 24 carbon atoms are a preferred class of alkylphenols to be used in the preparation of the compounds of this invention. The propylene polymers which are used in the preparation of these alkylphenols are available commercially and, in general, boil within the range of 115° C. to 350° C. Such alkylphenols, as well as the other alkylphenols contemplated herein, can be prepared by methods well known to those skilled in the art. One method of preparing the alkylphenols from propylene polymers is described in U.S. 2,865,966. The class of alkylphenols is preferably prepared according to the methods disclosed in U.S. application Serial No. 21,872, filed April 13, 1960, and now abandoned; U.S. application Serial No. 44,439, filed July, 1960; and U.S. application Serial No. 44,464, filed July 21, 1960, all assigned to applicants' assignee.

Such terms as "propylene trimer" or "propylene tetramer," as used herein, shall be understood to refer to those hydrocarbons present in the product resulting from polymerization of propylene. Such a polymerization reaction does not proceed so smoothly or accurately as to yield only exact tri or tetra multiples of the propylene feed, it should be clear that these terms are meant to be descriptive of the hydrocarbons present in the polymer product and boiling respectively within the $C_9$ and $C_{12}$ olefin boiling ranges, which ranges embrace the boiling points of the various isomeric $C_9$ and $C_{12}$ polymer hydrocarbons present therein. Such a construction should also be given to the terms used to describe the other propylene polymers and the butylene polymers.

It should be pointed out that the alkylphenols employed in preparing the compounds of this invention need not necessarily be pure para or meta compounds. It will be apparent that, during the alkylation of the phenols, some isomeric material will be formed. Although it is preferred to employ alkylphenols which comprise only the single desired isomer, the presence of relatively minor amounts of other isomers does not have any signficant adverse effect. For example, the alkylphenols which are derived from propylene and butylene polymers (e.g., Example I) can be employed with a para to ortho ratio of 4:1. When isomeric mixtures are used, it is preferred that the para to ortho ratio be at least about 6:1.

Particularly from the standpoint of optimum stabilizing effectiveness, and also considering the ready availability of starting materials and commercial practicality, an especially preferred group of esters is characterized by the formula,

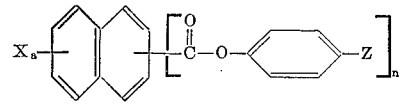

wherein:

$a$ is a integer from 0 to 2;

X is selected from the group consisting of chlorine, alkyl of 1 to 4 carbon atoms, and alkoxy of 1 to 4 carbon atoms;

Z is selected from the group consisting of α-cumyl and

where R, $R_1$ and $R_2$ are alkyl of 1 to 21 carbon atoms, and the sum of $R+R_1+R_2$ is up to 23 carbon atoms; and $n$ is an integer from 1 to 2, provided that when $n$ is 2, the carboxyl groups are on non-adjacent carbon atoms of the naphthalene nucleus.

Typical examples of this preferred group of naphthoic acid esters are:

4-t-butylphenyl 2-naphthoate,
4-(1,1,3,3-tetramethylbutyl)phenyl 1-naphthoate,
4-α-cymylphenyl x-chloro-1-naphthoate,
bis-[4-(1-ethyl-1-methylphenyl)phenyl]naphthalene-1,5-dicarboxylate,
bis-(4-t-butylphenyl) 1-methylnaphthalene-2,5-dicarboxylate, and those mono- and diesters of naphthoic acids wherein the 4-alkylphenyl groups come from the reaction product of a phenol and the above-noted, branched chain propylene and butylene polymers. As should be apparent, the aklylphenols prepared from such polymers will be predominantly those wherein the alkyl group is attached to the nucleus through a tertiary carbon atom.

As hereinbefore disclosed, the polymeric materials which are modified by the naphthoic acid esters are natural and synthetic, linear and cross-linked polymers, which are subject to ultraviolet light deterioration.

Fibrous cellulosic products are prime examples of the natural polymeric materials which are advantageously modified by the naphthoic acid esters. This includes products made of cotton, linen regenerated cellulose, kapok, hemp, wood and wood pulp; e.g., textiles, twines, paper, cardboard, pressed board, batting wood flour, sawdust, etc. Another group of natural polymers of carbohydrate origin includes the starches such as those derived from corn, barley, potato, and cassava. Another class of natural polymers with which the naphthoic acid esters are beneficially used are the natural gums; e.g., agar, gum arabic, psyllium seed, tragacanth and gum karaya. Natural rubber is also included.

Synthetic polymeric materials, i.e., those high molecular weight materials which are not found in nature, with which the naphthoic acid esters are advantageously employed may be either linear or cross-like polymers, and they may be either those which are produced by addition polymerization or by condensation.

An important class of polymers which are beneficially modified according to the invention are those obtained from a polymerizable monomer compound having ethylenic unsaturation. Such monomers have the general formula, $>C=C<$, wherein the ethylenic group is substituted by a member of the group consisting of hydrogen, halogen, alkyl, aryl, aralkyl, alkaryl, alkenyl, alkynyl, cycloalkyl, haloalkyl, haloaryl, haloaralkyl, haloalkaryl, haloalkenyl, haloalkynyl, nitroalkyl, nitroaryl, nitroaralkyl, nitroalkaryl, nitroalkenyl, alkoxyalkyl, alkenyloxyalkyl, carboalkoxy, cyano, amido, dialkylamino, aldehydo, acyl, pyridyl, thienyl, furanyl, pyranyl, tetrahydrofuranyl, quinonyl and higher heterocyclic groups. Specific examples of the above radicals are methyl, ethyl, propyl, butyl, phenyl, tolyl, xylyl, 4-ethylphenyl, benzyl, 2-penylethyl, vinyl, propenyl, butenyl, ethynyl, propynyl, butynyl, cyclopentyl, 2-methylcyclopentyl, cyclohexyl, chloro, fluoro, bromo, iodo, 2-chloroethyl, chlorovinyl, 1,2-dichloroethyl, 2-chlorophenyl, 2-(4-chlorophenyl) ethyl 4-bromobenzyl, 3-chloropropenyl, 3-nitropropyl, 4-nitrophenyl, 2-nitrobenzyl, nitrovinyl, ethoxy, methoxyethyl, vinyloxy, allyloxy, carbomethoxy, carboethoxy, acetyl, propionyl, cyano, formyl, acetoxy, propionoxy, carboxy, amido, furyl, carbazyl, indolyl, pyrrolyl, pyrrolidinyl, piperidinyl, diethylaminoethyl, and dimethylamido.

A particularly preferred class consists of the polymerized vinyl and vinylidene compounds, i.e., those having the $CH_2=C<$ radical. Compounds having such a radical are, for example, the alkenes, such as ethylene, propylene, isobutylene; acrylyl and alkacrylyl compounds such as acrylic, chloroacrylic, and methacrylic acids, anhydrides, esters, nitriles and amides, for example, acrylonitrile, ethyl or butyl acrylate, methyl or ethyl methacrylate, methoxymethyl or 2-(2-butoxyethoxy) ethyl methacrylate, 2-(cyanoethoxy)ethyl 3-(3-cyanopropoxy)propyl acrylate or methacrylate, 2-(diethylamino)ethyl or 2-chloroethyl acrylate or methacrylate, acrylic anhydride or methacrylic anhydride, methacrylamide or chloroacrylamide, ethyl or butyl chloroacrylate; the olefinic aldehydes such as acrolein, methacholein and their acetals; the vinyl and vinylidene halides such as vinyl chloride, vinyl fluoride, vinylidene fluoride, and 1-chloro-2-fluoroethylene; polyvinyl alcohol; the vinyl carboxylates such as vinyl acetate, vinyl chloroacetate, vinyl propionate, and vinyl 2-ethylhexanoate; the N-vinyl imides such as N-vinyl phthalimide and N-vinylsuccinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds, or copolymers or terpolymers thereof, are beneficially modified by the naphthoic esters. Examples of such copolymers or terpolymers are those obtained by polymerization of the following monomer mixtures: vinyl chloride-vinyl acetate; acrylonitrile-vinylpyridine; styrene-methyl methacrylate; styrene-N-vinylpyyolidone; cyclohexyl methacrylate-vinyl chloroacetate; acrylonitrile-vinylidene cyanide; methyl methacrylate-vinyl acetate; ethyl acrylate-methacrylamide-ethyl chloroacrylate; vinyl chloride-vinylidene chloride-vinyl acetate; etc.

Other presently employed polymers of compounds having the ethylenic group, $>C=C<$, are the homopolymers, copolymers, and terpolymers of the α,β-olefinic discarboxylic acids and the derivatives thereof, such as the anhydrides, esters, amides, nitriles, and imides; e.g., methyl, butyl, 2-ethylhexyl or dodecyl fumarate or maleate, maleic, chloromaleic, citroconic or itaconic anhydride, fumaronitrile, dichlorofumaronitrile or citracononitrile, fumaramide, or maleamide, maleimide or N-phenylmalemide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of a dialkyl fumarate such as ethyl or butyl fumarate and a vinyl compound such as styrene, vinyl acetate, vinylidene chloride, ethyl methacrylate, acrylonitrile, etc.

Readily and advantageously modified by the naphthoic acid esters are also the polymers and copolymers of unsaturated, cyclic esters of carbonic acid; e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the naphthoic acid esters are also polymers, copolymers or terpolymers or polymerizable compounds having a plurality of double bonds; e.g., a rubbery, conjugated diene polymerizate such as homopolymerized 2,3-butadiene, 2-chlorobutadiene or isoprene, and linear copolymers or terpolymers such as butadiene-acrylonitrile copolymer, isobutylene-butadiene copolymer (butyl rubber), butadiene-styrene copolymer or 2-chlorobutadiene–vinylidene cyanide–acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate; and other di-ethylenically unsaturated compounds such as diallyl carbonate, divinyl ether or divinylbenzene, as well as the cross-linked polymeric material such as methyl methacrylate-diallyl methacrylate copolymer or butadiene-styrene-divinylbenzene terpolymer.

Polymerized material prepared by subsequent reaction of preformed vinyl polymers, e.g., polyvinyl alcohol, the polyvinyl acetals such as polyvinyl formal or polyvinyl butyral, or completely or partially hydrolyzed polyacrylonitrile, are likewise modified in properties by the naphthoic acid esters to give the polymeric material of enhanced stability.

Homopolymers and copolymers of the following polymerizable heterocyclic compounds are also advantageous modified by the present compounds: vinylpyridine, vinyl furan, vinyldibenzofuran, N-vinylcarbazole.

Polymeric materials with which the naphthoic acid esters can be employed as adjuvants are also polymers which contain elements such as sulfur, phosphorus, boron or silicon; e.g., the sulfides, sulfones, sulfoxides, sulfites, sulfates and sulfonates such as the polymers and copolymers of vinyl sulfide, vinyl sulfone, 2-propenyl sulfoxide, ethylenesulfonic acid and its salts, esters, and amides, and sulfonated polystyrene, the olefin-sulfur dioxide polymers, the phosphines, phosphites, phosphates, and phosphonates such as diphenylvinylphosphine, allyl phosphite and methallyl phosphite, ethylenephosphonic acid and styrenephosphonic acids and their salts, esters and amides, the silanes such as dimethylvinylsilane, diphenylvinylsilane and methylphenylvinylsilane; etc.

A class of synthetic polymeric materials with which the naphthoic acid esters are very useful comprises the cellulose derivatives; e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The naphthoic acid esters may be incorporated into films of such cellulose derivatives by adding the esters to the solutions from which the films are cast or into the melts from which the fibers are extruded.

The naphthoic acid esters are particularly suited for the modification of liquid resin compositions of the polyester type. Such resins are well adapted for structural fabrications, particularly in the manufacture of reinforced fibrous structures, e.g., glass or cellulosic fibers. Polyester resins with which the naphthoic acid esters are useful are either the linear polyesters which are obtained by the reaction of the one or more polyhydric alcohols with one or more $\alpha,\beta$-unsaturated polycarboxylic acids alone or in combination with one or more saturated polycarboxylic acid compounds, or the cross-linked polyester resins which are obtained by reacting a linear polyester with a compound containing a $CH_2=C<$ group.

Polyhydric alcohols which are used for the preparation of the presently modified polyester resins are, for example, ethylene glycol, diethylene glycol, propylene glycol, trimethylene glycol, trimethylolpropane, trimethylolethane, 1,4-butanediol, 4,4'-isopropylidenediphenol, 4,4'-isoproylidenedicyclohexanol, hydroquinone, 1,2-dihydroxynaphthalene, 4,4'-dihydroxybiphenyl, 4,4'-(2-butylidene)-di-m-cresol, glycerol, pentaerythritol, mannitol, etc.

The polycarboxylic acid compounds used in preparing the presently modified polyester resins are, for example, the $\alpha,\beta$-unsaturated acids or the anhydrides or acyl halides thereof, such as maleic acid, maleic anhydride, maleyl chloride, fumaric acid, itaconic acid, itaconoyl chloride, mesoconic acid, citraconic acid, etc.; the alkanedicarboxylic acids, anhydrides or acyl halides thereof, such as oxalic or malonic acid, anhydride or acyl halide, succinic acid, anhydride or halide, adipic acid, acyl halide or anhydride and sebacic acid, acyl halide or anhydride; the cycloparaffindicarboxylic acids such as 1,2-cyclohexanedicarboxylic acid or its anhydride or acyl halide; the aromatic dicarboxylic acids such as phthalic, terephthalic or 1,2-naphthalenedicarboxylic acid or the anhydrides or acyl halides thereof; the halogenated dicarboxylic compounds such as dichloroterephthalic acid or 1,4,5,6,7,7-hexachlorobicyclo - (2,2,1) - 5 - heptene-2,3-dicarboxylic anhydride; etc.

The cross-linking component of the presently modified polyester resins can be any compound containing the group, $CH_2=C<$, and having a boiling point of at least 60° C. Among the numerous compounds employed for this purpose, there may be mentioned styrene, the nuclear or side-chained substituted styrenes such 3,4-dichlorostyrene, $\alpha$-chlorostyrene, $\alpha$-methylstyrene, 4-fluorostyrene, 2-(trifluoromethyl)styrene, 2,5-dimethylstyrene, isopropenyltoluene and 4-ethylstyrene; and other vinyl-substituted hydrocarbons such as $\alpha$- or $\beta$-vinylnaphthalene, 4-vinylbiphenyl, 2-vinylacenaphthene and 2-vinylfluorene; the olefinic carboxylic acids and the esters, nitriles, amides and anhydrides thereof such as acrylic acid, methacrylic acid, ethyl acrylate, methyl methacrylate, acrylonitrile, methacrylonitrile, acrylamide, methacrylamide, acrylic anhydride and methacrylic anhydride; the vinyl esters such as vinyl acetate, vinyl chloroacetate, vinyl propionate and vinyl benzoate; the olefinic ketones such as ethyl vinyl ketone and isopropenyl methyl ketone; the alkenes such as isobutylene and 2-pentene; the olefinic ethers such as vinyl ethyl ether and vinyl isobutyl ether; vinyl-substituted heterocyclic compounds such as N-vinylpyrrole, N-vinylpyridine and N-vinylsuccinimide; the olefinic aldehydes such as acrolein and methacrolein; the esters of unsaturated alcohols such as allyl acetate, triallyl phosphate, tetrallyl silicate, allyl fumarate, cinnamyl propionate, 3-butenyl acetate, etc.

The naphthoic acid esters may be added to the polyester compositions at any stage of processing after the esterification. For preparation of casting and laminating resins, a recommended procedure is to first prepare a resin syrup by reacting the polyhydric alcohol component with the polycarboxylic acid component and then to add the naphthoic acid ester to a mixture of the resin syrup and the cross-linking agent, i.e., the vinyl or vinylidene compound, prior to curing. This latter step is generally effected in the presence of a catalyst for polymerization, e.g., benzoyl peroxide, ethyl methyl ketone peroxide or tert.-butyl hydroperoxide, and with optional use of additives such as mold lubricants, reinforcing agents, pigments, etc.

The naphthoic acid esters are useful for modifying either the cast polyester resins or fibers and foams prepared from polyester resins. Said esters are preferably added to the ejection mix, as in the case of fiber manufacture, or to the foam mix prior to hardening. Good results can be obtained, however, by application of the esters to the finished fibers or foams, e.g., by immersing or spraying the polyester fibers or textiles prepared therefrom in or with solutions of the naphthoic acid esters or by similar treatment of the polyester foams.

The naphthoic acid esters are also valuable adjuvants for film-forming polyesters which may or may not be modified with drying or semi-drying fatty oils or terpenic compounds.

The polyhydric alcohol component may be any of those mentioned above, except that in the case of the coating and impregnating agents, the aliphatic compounds are more generally employed, e.g., glycerol, triethylene glycol, pentaerythritol, etc. The polycarboxylic acid need not be unsaturated, the more frequently employed acid component being phthalic anhydride. However, depending upon end utility and specific properties desired, acid components such as maleic anhydride, fumaric acid, adipic acid and sebacic acid are often used. For the production of materials such as enamels, the esterification reaction may be conducted in the presence of fatty oils, such as linseed oil, castor oil or soybean oil, or in the presence of terpenes, such as pinene or terpineol. A small quantity of metallic soap, which serves to accelerate the drying properties of the modified or unmodified alkyd resins, is usually added to the reactant mixture. Such "driers" include zinc stearate, calcium laurate, magnesium hydroxy stearate, etc.

The epoxy resins are another class of polymeric materials with which the present esters are compatible and are advantageously used. These resins are condensation products formed by the reaction of a polyhydroxy compound and epichlorohydrin, which condensation products are subsequently cured by addition of cross-linking agents. The hydroxy compound may be any of the polyhydric compounds mentioned above as useful in the preparation of polyester resins; bisphenol, i.e., 4,4'-isopropylidenediphenol, is the commonly employed polyhydric compound. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine. The naphthoic acid esters are advantageously added to the linear condensation product of the epichlorohydrin and the polyhydric compound, together with the cross-linking agent, prior to curing or hardening. The resulting mixtures is then cast into molds, or it may be used for the manufacture of laminates, as bonding adhesive, and for the production of hard foams. For the latter use, the mixture of linear condensation product, the naphthoic acid ester and cross-linking agent is cured in the presence of blowing agents.

The polyurethanes comprise another class of polymeric materials which are beneficially modified by the naphthoic acid esters. The polyurethanes, like the above-mentioned polyesters, are commercial materials which are employed in structural applications, e.g., as insulating foams, in the manufacture of textile fibers, as resin bases in the manufacture of curable coating compositions, and as impregnating adhesives in the fabrication of laminates of woods and other fibrous materials. Essentially the polyurethanes are condensation products of a diisocyanate and a compound having a molecular weight of at least 500 and preferably about 1,500–5,000, and at least two reactive hydrogen atoms, i.e., hydrogen atoms determinable by the Zerewitinoff method. The useful active hydrogen-containing compounds may be polyesters prepared from polycarboxylic acids and polyhydric alcohols, polyhydric polyalkylene esters having at least two hydroxyl groups, polythioether glycols, polyesteramides, etc. Advantageously the hydroxyl number of the polyhydric compound is not substantially more than about 225 and is seldom less than 56. When a polyester is used, the acid number is less than 10 and usually is as near to 0 as possible. An excess of the diisocyanate over that required to react with all of the active hydrogen atoms of the organic compound is advantageously used.

The polyesters used for the production of the polyurethane may be branched and/or linear. Thus, the useful polyesters and/or polyesteramides may include those obtained by condensing any polybasic (preferably dibasic carboxylic) organic acid, such as adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di($\beta$-hydroxyethyl) ether, etc., and/or amino-alcohols, such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc., and with mixtures of the above polyalcohols and amines such as ethylene diamine, hexamethylene diamine, 3-methylhexamethylene diamine, decamethylene diamine and m-phenylenediamine, etc., and/or amino-alcohols, etc. In the esterification, the acid per se may be used for condensation or, where desirable, equivalent components such as the acid halide or anhydride may be used.

The alkylene glycols, and polyoxyalkylene or polythioalkylene glycols, used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc., and diethylene glycol, triethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1,200, 2,000, etc.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 1,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form, such as the bisphenyl carbamates of toluylene diisocyanate, p,p'-diphenylmethane diisocyanate, p-phenylene diisocyanate and 1,5-naphthalene diisocyanate, etc.

In practice, the polyurethane plastics are produced by bringing together the organic compound, which contains at least two reactive hydrogen atoms and is capable of forming polyurethanes, with the polyisocyanate and an activator mixture. The latter is made up of at least one cross-linking agent and/or an accelerator and may contain, if desired, added water or an aqueous solution. The addition of such an activator mixture to the mixture of polyisocyanates and active hydrogen compound initiates the cross-linking action needed to obtain homogeneous plastics or the cross-linking and foaming action necessary to obtain foam plastics. Useful cross-linking agents include water or aqueous solutions for foamed plastics and the polyalcohols, such as ethylene glycol, propylene glycol, butylene glycol, diethylene glycol, triethylene glycol, glycerol, etc., for non-porous plastics; and useful accelerators include the tertiary amines (either individually or in mixture), such as dimethylhexahydroaniline, diethylhexahydroaniline, reaction products of N,N'-diethylaminoethanol and phenylisocyanate, esteramines, etc. Also sodium phenolates, added with suitable plasticizers, may be employed in the manufacture of foamed products.

In fiber applications, the naphthoic acid esters are advantageously incorparated into the spinning solution or into a solution of the polyurethane previous to precipitation from a non-solvent. For example, a mixture of substantially equimolar proportions of tetramethylene diisocyanate and 1,6-hexanediol is heated in an inert solvent, such as chlorobenzene, the ester is added to the resulting solution, and the whole is precipitated by pouring it into hexane.

When the presently provided, modified, polyurethane resin is to be used for the preparation of coatings or films, the ester is advantageously added to a solution of the polyurethane prior to hardening of the film or application of the coating.

Phenolic resins are also beneficially modified by the naphthoic acid esters, which compounds are incorporated into the resin either by milling in molding applications or by addition to film-forming or impregnating and bonding solutions previous to casting. Phenolic resins with which the naphthoic acid esters are employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding of extruding resin or as the resin base in coating and impregnating compositions. When destined for use as molding resins, the phenol is generally condensed with the aldehyde in the presence of alkali, and the naphthoic acid ester is added to the resulting liquid resin prior to the curing stage.

The aminoplasts comprise another group of aldehyde resins which are beneficially modified by the naphthoic acid esters. This class of polymeric materials is prepared by condensing formaldehyde with amino compounds containing from 1 to 9 carbon atoms and having the grouping,

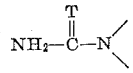

where T is selected from the class consisting of O, S and N—, and where N< represents a nitrogen atom having two single valences attached to separate hydrogen or carbon atoms or where the two free valences of the nitrogen atom represent a double bond attached to a carbon atom. The group N— of the above-described amino compounds represents a nitrogen atom having one free valence which is attached to a carbon or hydrogen atom. The condensation product is formed by using sufficient aldehyde, preferably formaldehyde, to react with at least one of the replaceable hydrogen atoms of the amino groups.

Examples of the aminoplasts which are modified according to the invention are the heat-convertible condensation products of an aldehyde with urea, thiourea guanidine, cyanamide, dicyandiamide, alkyl or aryl guanamines, and the triazines such as melamine, 2-chloro-4,6 - diamino - 1,3,5-triazine and 2-hydroxy-4,6-diamino-1,3,5-triazine. The aminoplasts may be prepared by using various aldehydes instead of formaldehyde; e.g., there may be used acetaldehyde, propionaldehyde, furfural, glyoxal, and the like.

In molding applications, the ester is compounded with the resin, together with the customary dyes or pigments and fillers, e.g., cellulose, asbestos, wood flour, glass fibers, chopped cotton fabric, etc.

Also beneficially modified by the naphthoic acid esters are the nylons, i.e., the superpolyamides which are generally obtained by the condensation of a diamine, e.g., hexamethylenediamine, with a dicarboxylic acid, e.g., adipic acid.

Other polyamides with which the naphthoic acid esters are beneficially employed, e.g., for improvement in light stability, are the polypeptides which may be prepared, e.g., by the condensation reaction of an N-carboalkoxy substituted, or an N-acyl substituted, α-amino carboxylic acid with the same or different unsubstituted amino carboxylic acid, e.g., by reaction of N-carbobenzyl oxyglycin with glycine or a mixture of glycine and lysine, or an N-carboxy amino acid anhydride such as N-carboxy-DL-phenylaniline anhydride.

Still another class of polyamides which are beneficially modified according to the invention are the polymeric lactams, e.g., polycaprolactam, piperidone, 2-oxohexamethyleneimine and other cyclic amides. The naphthoic acid esters can be incorporated into molding or extruding compositions for light stabilizing effects.

The naphthoic acid esters are also advantageously employed as adjuvants for polymeric aldehyde, e.g., homopolymeric, high-molecular weight formaldehyde.

The naphthoic acid esters are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid; the polyamides which are obtained by the self-condensation of amino carboxylic acids such as 4-aminobutyric acid or 6-aminocaproic acid; the polyanhydrides which are obtained by the self-condensation of dicarboxylic acids such as sebacic acid or adipic acid.

The preparation of several exemplary naphthoic acid esters of this invention is hereinafter set forth in detail. It is to be understood that such specific examples are illustrative only and should not be construed as limiting the invention in any manner.

EXAMPLE I

This example describes the preparation of 4-nonylphenyl 1-naphthoate from a $C_9$-alkylphenol, distillation range (5 mm. Hg):

|  | ° C. |
|---|---|
| First drop | 288 |
| 5–95% | 288–313 |
| End | 316 | whose alkyl substituent is derived from propylene trimer (boiling range 121–138° C.).

A mixture containing 19.06 grams (0.1 mol) of 1-naphthoyl chloride, 22.04 grams (0.1 mol) of said $C_9$-alkylphenol, and 50 ml. of benzene is placed in a suitable flask. The mixture is agitated, and 0.15 mol of triethylamine is added slowly. The resulting mixture is heated to reflux and is held there for about one hour. The reaction mixture is then washed once with a dilute aqueous solution of HCl, and with distilled water, until a test shows that said mixture is neutral. The water and benzene are distilled off, and the product is filtered. There is obtained a 95% yield of 4-nonylphenyl 1-naphthoate.

EXAMPLE II

Following the procedure of Example I, 2-naphthoyl chloride is employed as the halide reactant. There is obtained a 96.5% yield of 4-nonylphenyl 2-naphthoate, $n_D^{25}=1.5428$.

EXAMPLE III

Following the procedure of Example I, the phenol reactant employed is derived from propylene pentamer (boiling range 260–265° C.). There is obtained a 95% yield of 4-pentadecylphenyl 1-naphthoate.

The procedure described in Example I is repeated with the phenols and naphthoyl halides hereinafter set forth. The molar proportions are as previously employed, and the naphthoic acid esters are obtained in yields of about 95–98%.

EXAMPLE IV

Phenol: $C_{13}$-alkylphenol derived from a propylene polymer mixture (boiling range 200–260° C.) containing an average of 13 carbon atoms.
Halide: 1-naphthoyl chloride.
Ester: 4-tridecylphenyl 1-naphthoate.

EXAMPLE V

Phenol: $C_{18}$-alkylphenol derived from propylene hexamer (boiling range 260–290° C.).
Halide: 2-naphthoyl chloride.
Ester: 4-octadecylphenyl 2-naphthoate.

EXAMPLE VI

Phenol: $C_{21}$-alkylphenol derived from a propylene polymer mixture (boiling range 295–325° C.) containing an average of 21 carbon atoms and consisting chiefly of propylene hexamer and propylene octamer.
Halide: 1-naphthoyl chloride.
Ester: 4-heneicosylphenyl 1-naphthoate.

EXAMPLE VII

A mixture containing 25.3 grams (0.1 mol) of 2,7-naphthalenedicarbonyl chloride, 41.26 grams (0.2 mol) of 4-(1,1,3,3-tetramethylbutyl)phenol, and 50 ml. of benzene is charged to a suitable flask. This mixture is agitated, and 0.3 mol of triethylamine is added slowly. The resulting mixture is heated to reflux and is held there for about one hour. The reaction mixture is then washed once with a dilute aqueous solution of HCl, and with distilled water, until a test shows that the mixture is neutral. The water and benzene are distilled off, and the product is recrystallized from a chloroform-methanol solution. There is obtained an 82% yield of bis-[4-(1,1,3,3-tetramethylbutyl)phenyl] naphthalene - 2,7-dicarboxylate, M.P. 208–212° C.

EXAMPLE VIII

Following the procedure of Example VII, 1,4-naphthalenedicarbonyl chloride is employed as the halide reactant. There is obtained a 79% yield of bis-[4-(1,1,3,3-tetramethylbutyl)phenyl] naphthalene-1,4-dicarboxylate, M.P. 131.5–133° C.

The procedure described in Example VII is repeated with the phenols and dihalides hereinafter set forth. The molar proportions are as previously employed, and the naphthoic acid esters are obtained in yields of about 75–85%.

EXAMPLE IX

Phenol: 3-ethoxyphenol.
Halide: 1,3-naphthalenedicarbonyl chloride.
Ester: bis-(3-ethoxyphenyl) naphthalene-1,3-dicarboxylate.

EXAMPLE X

Phenol: 4-(ethyl-1-methylpentyl)phenol.
Halide: 1,5-naphthalenedicarbonyl chloride.
Ester: bis-[4-(1-ethyl - 1-methylpentyl)phenyl] naphthalene-1,5-dicarboxylate.

EXAMPLE XI

Phenol: 3-dodecyloxyphenol.
Halide: 6-chloro-1,4-naphthalenedicarbonyl chloride.
Ester: bis-(3-dodecyloxyphenyl) 6-chloronaphthalene-1,4-dicarboxylate.

EXAMPLE XII

Phenol: 4-t-butylphenol.
Halide: 1-methyl-2,5-naphthalenedicarbonyl chloride.
Ester: bis-(4-t-butylphenyl) 1-methylnaphthalene-2,5-dicarboxylate.

EXAMPLE XIII

Phenol: 4-α-cumylphenol.
Halide: 1,7-naphthalenedicarbonyl chloride.
Ester: bis(4-α-cumylphenyl) naphthalene-1,7-dicarboxylate.

The procedure described in Example VII is further repeated with the phenols and the tri or tetrahalides hereinafter set forth. It will be apparent that the molar ratio of phenol to halide will be 3:1 or 4:1, depending upon the number of acid halide groups on the naphthalene nucleus.

EXAMPLE XIV

Phenol: 4-t-butylphenol.
Halide: 1,3,6-naphthalenetricarbonyl chloride.
Ester: tris-(4-t-butylphenyl) naphthalene-1,3,6-tricarboxylate.

EXAMPLE XV

Phenol: 4-t-amylphenol.
Halide: 1,3,8-naphthalenetricarbonyl chloride.
Ester: tris-(4-t-amylphenyl) naphthalene-1,3,8-tricarboxylate.

EXAMPLE XVI

Phenol: 3-methoxyphenol.
Halide: 1,2,4,5-naphthalenetetracarbonyl chloride.
Ester: tetra(3-methoxyphenyl) naphthalene-1,2,4,5-tetracarboxylate.

EXAMPLE XVII

Phenol: 4-(1,1-dimethylbutyl)phenol.
Halide: 2-chloro-1,4,5,8-naphthalenetetracarbonyl chloride.
Ester: tetra-[4-(1,1-dimethylbutyl)phenyl] 2-chloronaphthalene-1,4,5,8-tetracarboxylate.

EXAMPLE XVIII

A mixture containing 19.06 grams (0.1 mol) of 1-naphthoyl chloride, 15.02 grams (0.1 mol) of 4-t-butylphenol, and 50 ml. of benzene is placed in a suitable flask. The mixture is agitated, and 0.15 mol of triethylamine is added slowly. The resulting mixture is heated to reflux and is held there for about one hour. The reaction mixture is then washed with a dilute aqueous solution of HCl, and with distilled water, until a test shows that said mixture is neutral. The water and benzene are distilled off, and the product is recrystallized from a benzene-methanol solution. There is obtained an 80% yield of 4-t-butylphenyl 1-naphthoate, M.P. 104° C.

EXAMPLE XIX

Following the procedure of Example XVIII, 2-naphthoyl chloride is employed as the halide reactant. The product is recrystallized from methanol, and there is obtained 4-t-butylphenyl 2-naphthoate, M.P. 124–125° C.

EXAMPLE XX

Following the procedure of Example XVIII, the reactants employed are x,x'-di-t-butyl-x''-naphthoyl chloride and 3-phenoxyphenol. There is obtained 3-phenoxyphenyl x,x'-di-t-butyl-x''-naphthoate as a resinous product.

EXAMPLE XXI

Following the procedure of Example XVIII, the reactants employed are x,x'-di-t-butyl-x''-naphthoyl chloride and 4-phenylphenol. The product is recrystallized from a chloroform-methanol solution, and there is obtained a 78% yield of 4-phenylphenyl x,x'-di-t-butyl-x''-naphthoate, M.P. 176–179° C.

EXAMPLE XXII

Following the procedure of Example VII, 0.1 mol of the phenol is used, and 1-naphthoyl chloride is employed as the halide reactant. There is obtained an 80% yield of 4-(1,1,3,3-tetramethylbutyl)phenyl 1-naphthoate, M.P. 112, 118° C. (polymorphic).

The procedures detailed above are followed employing the phenols and halides hereinafter set forth. The molar ratios of the reactants will be dependent upon the number of acid halide groups on the naphthalene nucleus, and the ester products are obtained in good yield.

EXAMPLE XXIII

Phenol: 3-t-butoxyphenol.
Halide: 1,6-dibromo-2-naphthoyl chloride.
Ester: 3-t-butoxyphenyl 1,6-dibromo-2-naphthoate.

EXAMPLE XXIV

Phenol: $C_9$-alkylphenol (as in Example I).
Halide: 1,4,5-naphthalenetricarbonyl chloride.
Ester: tris-(4-nonylphenyl) naphthalene-1,4,5-tricarboxylate.

EXAMPLE XXV

Phenol: 4-α-cumylphenol.
Halide: 6-isopropyl-4-methyl-1-naphthoyl chloride.
Ester: 4-α-cumylphenyl 6-isopropyl-4-methyl-1-naphthoate.

EXAMPLE XXVI

Phenol: 4-t-butylphenol.
Halide: 4-dodecyl-2-naphthoyl chloride.
Ester: 4-t-butylphenyl 4-dodecyl-2-naphthoate.

EXAMPLE XXVII

Phenol: $C_{15}$-alkylphenol (as in Example III).
Halide: 4,8-dichloro-1,5-naphthalenedicarbonyl chloride.
Ester: bis-(4-pentadecylphenyl) 4,8-dichloronaphthalene-1,5-dicarboxylate.

EXAMPLE XXVIII

Following the procedure of Example XXII, 2-naphthoyl chloride is employed as the halide reactant. The product is recrystallized from an acetone-methanol solution, and there is obtained 4-(1,1,3,3-tetramethylbenyl)phenyl 2-naphthoate, M.P. 102–104° C.

EXAMPLE XXIX

Following the procedure of Example XXII, the reactants employed as 1-methyl-x-naphthoyl chloride and 3-n-octadecyloxyphenol. The product is recrystallized from a benzene-methanol solution, and there is obtained 3-n-octadecyloxyphenyl 1-methyl-x-naphthoate, M.P. 72.5–73.5° C.

EXAMPLE XXX

Following the procedure of Example XXII, the reactants employed as x-chloro-1-naphthoyl chloride and 4-α-cumylphenyl. The product is recrystallized from acetone, and there is obtained 4-α-cumylphenyl x-chloro-1-naphthoate, M.P. 113–114° C.

EXAMPLE XXXI

Following the procedure of Example I, 4-n-butylphenol is employed in place of the $C_9$-alkylphenol. There is obtained a 95% yield of 4-n-butylphenyl 1-naphthoate, $n_D^{25} = 1.5945$.

EXAMPLE XXXII

Following the procedure of Example XVIII, p-cresol is employed in place of the 4-t-butylphenol. The product is recrystallized from an ether-methanol solution, and there is obtained 4-tolyl 1-naphthoate, M.P. 61.5–62.5° C.

In evaluating the light stabilizing efficiency of the naphthoic acid esters of this invention, use is made of the following empirical testing methods:

(1) *Carbonyl content.*—The carbonyl content of the composition is determined after exposure by measurement of the infrared absorption in the 5.82 millimicron region and is expressed as mols×$10^4$ per liter. Reference is made to the following two publications concerning the determination of carbonyl content by infrared measurements: Rugg, Smith and Bacon, J. Polymer Sci. 13, 535 (1954); Cross, Richards and Willis, Discussions Faraday Soc., No. 9, 235 (1950).

(2) *Vinyl group formation.*—Infrared spectographic measurements are made before and after exposure using the baseline technique in the region of 11.0 microns and the extinction coefficients of J. A. Anderson and W. D. Sugfried, Anal. Chem. 20, 998 (1958). The amount of vinyl (C=C) formed during exposure is expressed in mols×$10^4$ per liter.

(3) *180° C. bend test.*—Specimens were folded and the amount of cracking, crazing, etc., was recorded.

The following procedures, in which all parts and percentages are by weight unless otherwise specified, more fully illustrate the nature of the invention.

Procedure 1

Test compositions are prepared by incorporating the additive into polyethylene (mol. wt. 20,000) on a heated roll mill. Thereafter the polyethylene is compression molded into sheets about 6 mils thick. Film samples containing the various additives noted below, and control films containing no additives, are exposed to ultraviolet radiation, a major portion of which is due to the 3130 and 3657 A. mercury lines (G.E. H3FE lamp). The films are exposed at a distance of 5 inches from a light source having a total ultraviolet emission of about 10 watts for a period of about 200 or 210 hours. The results obtained for several naphthoic acid esters of this invention are set forth in Table A, below. The additives employed are:

(A) 4-t-butylphenyl 1-naphthoate.
(B) 4-(1,1,3,3-tetramethylbutyl)phenyl 1-naphthoate.
(C) 4-t-butylphenyl 2-naphthoate.
(D) 4-(1,1,3,3-tetramethylbutyl)phenyl 2-naphthoate.
(E) 4-nonylphenyl 2-naphthoate (see Example II).
(F) 3-n-octadecyloxyphenyl 1-methyl-x-naphthoate (see Example XXIX).
(G) bis-[4-(1,1,3,3-tetramethylbutyl)phenyl]naphthalene-1,4-dicarboxylate.

TABLE A

| Composition No. | Additive | Hours | Conc., percent | Carbonyl Content | Vinyl Formation | Response to Bend Test |
|---|---|---|---|---|---|---|
| 1-1 | None | 200 | ---------- | 340 | 345 | Poor. |
| 1-2 | (A) | 200 | 1.0 | 227 | 0 | Good. |
| 1-3 | (B) | 200 | 1.0 | 174 | 0 | Do. |
| 1-4 | (C) | 200 | 1.0 | 240 | 0 | Do. |
| 1-5 | (D) | 200 | 1.0 | 164 | 40 | Do. |
| 1-6 | (E) | 200 | 1.0 | 240 | 0 | Do. |
| 1-7 | None | 210 | ---------- | 280 | 207 | Poor. |
| 1-8 | (F) | 210 | 1.0 | 391 | 0 | Good. |
| 1-9 | (G) | 210 | 1.0 | 71 | 0 | Do. |

Results similar to those obtained with Compositions 1–8 are realized upon substituting the following compounds, in substantially the same amount, for the naphthoic acid ester of said composition:

3-phenoxyphenyl x,x′-di-t-butyl-x″-naphthoate (see Example XX).
p-tolyl 1-naphthoate,
4-n-butylphenyl 1-naphthoate,
bis-(4-ethylphenyl) 6-chloronaphthalene-1,3-dicarboxylate,
bis-(3-methoxyphenyl) naphthalene-1,4-dicarboxylate,
tris-(4-isoamylphenyl) naphthalene-1,2,5-tricarboxylate,
tetra-(3-n-propoxyphenyl) naphthalene-1,4,5,8-tetracarboxylate.

Results similar to those obtained with Compositions 1–2, 1–3 and 1–6 are realized upon substituting the following compounds, in substantially the same amount, for the naphthoic acid esters of said compositions:

4-nonylphenyl 1-naphthoate (see Example I),
4-octadecylphenyl 2-naphthoate (see Example V),
4-α-cumylphenyl x-chloro-1-naphthoate (see Example XXX),
bis-[4-(1-ethyl-1-methylpentyl)phenyl]naphthalene-1,5-dicarboxylate,
bis-(4-t-butylphenyl) naphthalene-2,7-dicarboxylate.

Procedure 2

A piece of thin rubber film (natural gum rubber) is placed in chloroform for one hour, removed and then dried for two hours at room temperature. This piece is cut into two smaller pieces, one of which is placed in a chloroform solution containing 0.45% (w./v.) 4-nonylphenyl 2-naphthoate (see Example II) for one hour and then dried at room temperature. The two pieces are exposed for 60 hours to an ultraviolet lamp (General Electric H3FE) at a distance of 5 inches.

The rubber film containing the naphthoic acid ester can be stretched several times its length without breaking, while the film which does not contain said ester breaks when it is extended 1½ times its length.

Similar results are obtained when the naphthoic acid ester used above is replaced with the same amount of others of the various esters of Procedure 1.

*Procedure 3*

A piece of whatman filter paper (pure, unsized, cellulosic paper) is cut into two pieces. One piece (control sheet A) is dipped in chloroform solution and then dried. The other piece is dipped in a chloroform solution containing 0.45% (w./v.) 4-nonylphenyl 1-naphthoate (see Example I) and then dried (stabilized sheet B). Each of these sheets is exposed for a total of 60 hours to a General Electric UA–2 lamp at a distance of 10 inches. The tensile strength (lb./in.) of each of the sheets (i.e., control sheet A and stabilized sheet B) is tested at various intervals, and the paper containing the additive is of greater tensile strength.

Similar results are obtained when the naphthoic acid ester used on sheet B is replaced by the same amount of others of the esters of Procedure 1, in that the tensile strength of the sheet containing the ester is greater than the tensile strength of the control sheet.

*Procedure 4*

Polyethylene (avg. mol. wt. ca. 20,000) films of varying thicknesses, containing varying amounts of the following compounds:

(A) 4-t-butylphenyl 1-naphthoate,
(B) 4-nonylphenyl 2-naphthoate (see Example II), are prepared by dry blending each of the compounds in the amount desired, extruding the blends twice, and then blowing them into films. A control film, containing no ester, is prepared in the same manner. The films are exposed to direct sunlight in the State of Florida by mounting the films (unbacked at an angle of 45° from the horizontal) on racks facing the south. Samples of each film are removed periodically and tested for carbonyl content and vinyl group formation. The results obtained are set forth in Table B below:

*Procedure 5*

Ten grams of powdered polypropylene (visc. molecular weight 220,000) are mixed with 0.4% of bis-lauryl thiodipropionate, 0.3% of 4,4'-butylidenebis-(6-tert.-butyl-m-cresol), and a naphthoic acid ester. The specific esters are:

(A) 4-(1,1,3,3-tetramethylbutyl)phenyl 2-naphthoate,
(B) 4-nonylphenyl 2-naphthoate (see Example II).

The mixture is worked on a roll mill at 165–170° C. for 2–3 minutes. Films are formed from pieces of the milled sheets (0.8" x 1.2" x 0.012") by heat and pressure (11.3 kg.) between two polished glass plates (treated with dimethyldichlorosilane vapor and washed clean with chloroform and acetone) using copper wire spacers of suitable thicknesses. The "sandwiches" are heated under pressure on a hot plate (220–230° C.) for about 5 minutes and 10 minutes for 8-mill and 4-mill films, respectively. After air-cooling to about room temperature, the films are removed from the plates. Control films, containing no ester, are prepared in the same manner.

The films are exposed to direct sunlight in the State of Florida by mounting the films (unbacked at an angle of 45° from the horizontal) or racks facing the south. Samples of each film are removed periodically and tested for carbonyl content. The results obtained are set forth in Table C:

TABLE C

| Composition No. | Additive | Conc. (Percent by Weight) | Film Thickness, mil | Carbonyl Content | | |
|---|---|---|---|---|---|---|
| | | | | 1 Month | 2 Months | 3 Months |
| 5-1 | None | | 4 | 111 | 940 | 5950 |
| 5-2 | None | | 8 | 181 | 830 | (1) |
| 5-3 | (A) | 1.0 | 4 | 51 | 217 | 262 |
| 5-4 | (A) | 2.0 | 4 | 32 | 93 | 157 |
| 5-5 | (A) | 0.5 | 8 | 60 | 169 | 162 |
| 5-6 | (A) | 1.0 | 8 | 25 | 102 | 140 |
| 5-7 | (A) | 2.0 | 8 | 16 | 66 | 70 |
| 5-8 | (B) | 1.0 | 4 | 72 | 265 | 366 |
| 5-9 | (B) | 2.0 | 4 | 22 | 103 | 210 |
| 5-10 | (B) | 0.5 | 8 | 90 | 210 | 280 |
| 5-11 | (B) | 1.0 | 8 | 89 | 135 | 197 |
| 5-12 | (B) | 2.0 | 8 | 90 | 76 | 70 |

[1] Film gone.

Similar results are obtained when equal amounts of other esters are substituted for the above-named naphthoate.

*Procedure 6*

A series of film samples are prepared, each sample containing one of the following two additives:

(A) 4-(1,1,3,3-tetramethylbutyl)phenyl 2-naphthoate,
(B) 4-nonylphenyl 2-naphthoate (see Example II)

TABLE B

| Composition No. | Additive | Conc. (Percent by weight) | Film Thickness, mil | 1.2 Months Exposure | | 2.5 Months Exposure | | 4.6 Months Exposure | |
|---|---|---|---|---|---|---|---|---|---|
| | | | | Carbonyl | Vinyl | Carbonyl | Vinyl | Carbonyl | Vinyl |
| 4-1 | None | | 2 | 415 | | 1,110 | 375 | | |
| 4-2 | do | | 5 | 362 | 148 | 930 | 234 | 2,180 | 660 |
| 4-3 | (A) | 0.2 | 2 | 210 | | 780 | 130 | | |
| 4-4 | (A) | 0.5 | 2 | 169 | | 630 | 115 | | |
| 4-5 | (A) | 0.2 | 5 | 175 | 17 | 620 | 138 | 1,840 | 388 |
| 4-6 | (A) | 0.5 | 5 | 116 | 20 | 398 | 60 | 1,320 | 238 |

| | | | | 1 Month Exposure | | 2 Months Exposure | |
|---|---|---|---|---|---|---|---|
| | | | | Carbonyl | Vinyl | Carbonyl | Vinyl |
| 4-7 | None | | 4 | 354 | | 607 | |
| 4-8 | do | | 8 | 248 | | 484 | |
| 4-9 | (B) | 1.0 | 4 | 133 | | 244 | |
| 4-10 | (B) | 1.0 | 8 | 81 | | 145 | |
| 4-11 | (B) | 2.0 | 4 | 100 | | 202 | |
| 4-12 | (B) | 2.0 | 8 | 63 | | 103 | |
| 4-13 | (B) | 3.0 | 4 | 82 | | 134 | |
| 4-14 | (B) | 3.0 | 8 | 53 | | 60 | |

These additives are incorporated into the polymers either by addition to the solution prior to casting or by working polymer and additive on a stainless steel hot plate with a spatula. The films are prepared by either casting the mixture from an appropriate solvent or by pressing the mixture of polymer and additive between two glass slides at 190–240° C. Film thickness varies, depending upon the method of preparation. However, differences in thickness between films containing the additive and the corresponding control films are kept below 10%.

The films are mounted in special holders and exposed for 150 hours to an ultraviolet light source (G.E. lamp H3FE). At the end of the exposure period, each film containing an additive is compared with the corresponding control film for gross differences in degree of deterioration. Comparisons are made by:

(1) Increase of degradation carbonyl at the infrared carbonyl region.
(2) Response to 180° bend.
(3) Response to penetration by a sharp needle.
(4) Visual observation of film condition (crazing, cracking, etc.).

The results are listed in Table D. The degree of stabilization due to the additive is rated as follows:

(1) Some evidence of stabilization.
(2) Definite evidence of stabilization.
(3) Control deteriorated (cracked, disintegrated, etc., in holder), whereas the film containing the additive does not.

(E) bis-[4-(1,1,3,3-tetramethylbutyl)phenyl] naphthalene-1,4-dicarboxylate,
(F) bis-(4-α-cumylphenyl) naphthalene-1,7-dicarboxylate,
(G) 3-n-octadecyloxyphenyl 1-methyl x-naphthoate (see Example XXIX),
(H) 4-tridecylphenyl 1-naphthoate (see Example IV),
(I) 4-nonylphenyl 2-naphthoate (see Example II),
(J) 4-(1,1,3,3-tetramethylbutyl)phenyl 2-naphthoate,
(K) 4-(1,1-dimethylhexyl)phenyl 1-naphthoate,
(L) 3-n-butoxyphenyl 2-naphthoate,
(M) bis-(4-t-butylphenyl) 1-methylnaphthalene-2,5-dicarboxylate,
(N) 3-phenoxyphenyl x,x'-di-t-butyl-x''-naphthoate (see Example XX),
(O) bis-(4-nonylphenyl) naphthalene-2,7-dicarboxylate,
(P) bis-(3-octoxyphenyl) 4,8-dichloronaphthalene-1,5-dicarboxylate,
(Q) tris-(4-t-butylphenyl) naphthalene-1,3,6-tricarboxylate,
(R) tetra-(4-α-cumylphenyl) naphthalene-1,4,5,8-tetracarboxylate.

To 10% solutions of polystyrene in benzene, there is respectively added each of the above compounds in a quantity calculated to be 2% by weight of the total solids content.

The resulting mixtures are air dried at room temperature and then pressed between two glass slides at 190° C. to a thickness of about 150 microns. Control films are prepared in a similar manner. Each film is mounted in

TABLE D

| Composition No. | Polymer Name | Polymer Physical Properties | Film Preparation Method | Film Thickness (microns) | Additive | | Stabilization Rating |
|---|---|---|---|---|---|---|---|
| | | | | | Compound | Conc. Percent | |
| 6-1 | Cellulose nitrate | Visc. (10% soln. in solv. mixture of 75% butyl acetate, 25% ethanol) = 60 cps. N₂ content=12%. | Cast from acetone | 155 | (B) | 2.0 | 3 |
| 6-2 | Polyvinylidene chloride | Sp. gr.=1.680; $n_D^{25}$=1.615 | Pressed between 2 glass slides at 190–240° C. | 135 | (A) | 2.0 | 1 |
| 6-3 | Styrene-butadiene | Sp. gr.=1.030; Iodine No.= 57.8; $n_D^{25}$=1.5785. | Pressed between 2 glass slides at 190–240° C. | 230 | (B) | 2.0 | 3 |
| 6-4 | Styrene-acrylonitrile | Sp. gr.=1.075; HDT at 264 p.s.i.=198° F. | Pressed between 2 glass slides at 190–240° C. | 173 | (B) | 2.0 | 2 |
| 6-5 | Chlorinated rubber | 67% chlorine sp. gr.=1.563; $n_D^{25}$=1.554. | Cast from benzene | 50 | (A) | 1.3 | 3 |

Similar results are obtained when equal amounts of the following naphthoic acid esters are substituted for the two esters of this procedure:

4-t-butylphenyl 1-naphthoate,
4-pentadecylphenyl 1-naphthoate (see Example III),
4-octadecylphenyl 2-naphthoate (see Example V),
4-(1,1,3,3-tetramethylbutyl)phenyl 1-naphthoate,
4-t-butylphenyl 2-naphthoate,
4-nonylphenyl 1-naphthoate (see Example I),
4-α-cumylphenyl x-chloro-1-naphthoate (see Example XXX),
bis-[4-(1,1,3,3-tetramethylbutyl)phenyl] naphthalene-2,7-dicarboxylate.

In each case, the film containing the additive exhibits evidence of stabilization when compared with the control film.

*Procedure 7*

This procedure demonstrates the stabilizing effect of the following compounds on polystyrene:

(A) 4-t-butylphenyl 1-naphthoate,
(B) 4-octadecylphenyl 2-naphthoate (see Example V)
(C) 4-(1,1,3,3-tetramethylbutyl)phenyl 1-naphthoate,
(D) 4-t-butylphenyl 2-naphthoate, a holder and exposed to an ultraviolet lamp (G.E. H3FE) for a period of 200 hours. At the end of this period, the control film shatters when pierced by a sharp needle, whereas each film containing a naphthoic acid ester additive does not shatter when pierced with the needle.

*Procedure 8*

Compounds (A), (B), (D)–(G), (I) and (J) of Procedure 7 are respectively added to a high molecular weight polymeric formaldehyde resin (specific gravity= 1.425; HDT at 264 p.s.i.=212° F.; modulus of rigidity= 178,000 p.s.i.) by working the compound and the resin on a stainless steel hot plate and then pressing the resulting mixture into a film (thickness ca. 150 microns) between two glass plates at a temperature of 190–240° C. Two control films are prepared in a similar manner. The films are placed in holders and exposed at a distance of 5 inches from the ultraviolet rays of a G.E. H3FE lamp for a total of 150 hours. At the end of the test period, the control films break when subjected to the 180° bend test, while the films containing the additive of this invention do not.

Procedure 9

The stabilizing effect of Compounds (A)–(D), (H), (I) and (M) of Procedure 7 on polyvinyl chloride is described in this procedure. Each of these stabilizers is blended with a polyvinyl chloride mixture (containing 40 parts per 100 parts of resin of di(2-ethylhexyl) phthalate and 0.5 part per 100 parts of resin of cadmium-barium dilaurate) in an amount which is sufficient to provide 2.7 parts by weight of stabilizer based on the polyvinyl chloride content. Each mixture is pressed, at temperatures of 190–240° C., into a film about 150 microns thick and exposed to an ultraviolet lamp as in Procedure 8. Control films are prepared and exposed in a similar manner except, of course, that no stabilizer is added. After exposure, the films are examined visually for darkening. In each case, the films containing the naphthoic acid esters exhibit much less deterioration than do the control films.

Procedure 10

This procedure describes the light stabilizing effect of Compounds (D), (E) and (G)–(J) of Procedure 7 in cellulose acetate.

Each of said compounds is respectively added to a 12% solution of cellulose acetate in acetone, said compounds being added in a quantity equal to 5% by weight of the cellulose present in the solution. Films are cast from the resulting solutions and are air dried to remove the solvent. Control films are prepared in a similar manner. The films (about 150 microns in thickness) containing the compounds, and the control films, are exposed to ultraviolet light as in Procedure 7 and examined visually at the end of the test period for evidence of deterioration. In each case, the control films show strong evidence of deterioration, while the stabilized films containing the compounds of this invention deteriorated only slightly.

Procedure 11

To a 10% solution of a 50:50 molar ratio styrene:methyl methacrylate copolymer in benzene, there is respectively added one of Compounds (A)–(E), (I) and (O) of Procedure 7 in an amount which will provide 3% by weight of the compound based on the weight of the copolymer. The resulting mixtures, and a control mixture which does not contain a naphthoic acid ester, are cast into films (about 200 microns thick) and air dried for 24 hours. After exposure to an ultraviolet light source as in Procedure 7 for a period of 300 hours, the films containing the compounds and the control film are tested for gross differences in deterioration by piercing the films with a sharp needle. In each case, the film containing the naphthoic acid ester does not crack, while the control film cracks.

Procedure 12

This procedure describes the testing of Compounds (B)–(D), (F), (J) and (M) of Procedure 7 as light stabilizer for polymeric ethyl methacrylate. Each of said compounds is added at room temperature to a separate 15% solution of the polymeric methacrylate in an amount which will provide 2% by weight of stabilizer based on the weight of polymer present. Films are cast from the resulting mixtures and air dried for 24 hours. Control films consisting of polymer are prepared in a similar manner. Each film is about 50 microns (ca. 2 mils) thick. The films are exposed as in Procedure 7 and then evaluated for gross differences in deterioration between the control films and the stabilized films. Visual observation reveals that the control films show slight evidence of degradation, while the stabilized films do not.

Procedure 13

This procedure describes the testing of Compounds (A), (C)–(F), (I) and (O) of Procedure 7 as light stabilizers for 1:1 molar copolymers of maleic anhydride and vinyl methyl ether or ethylene. Each compound is added to separate 15% solutions of the ethylene-maleic anhydride copolymer in acetone and to separate 7% solutions of the vinyl methyl ether-maleic anhydride copolymer in dimethylformamide. The quantity of the compound employed in each instance is equal to 8% by weight of the copolymer present in the solution. The resulting mixtures, and control mixtures consisting of the respective copolymers and their solvents, are cast into films, and the solvent is evaporated from the films at heat lamp temperature. The films (each about 50 microns thick) are exposed to ultraviolet light as in Procedure 7 for a period of 300 hours. Evaluation of the films after the test period by visual observation indicates that the films containing the compounds are more stable to the degradative effects of ultraviolet light than are the control films.

Procedure 14

Films of approximately 0.125 inch are prepared from a polyester made from phthalic anhydride, maleic anhydride, and propylene glycol (in a ratio of 1:1:2.4) and 4-t-butylphenyl 1-naphthoate. Control films, containing no ester, are also prepared. These films are exposed in an Atlas Fade-Ometer, containing an enclosed carbon arc which produces a spectrum of from 279 m$\mu$ to 20,000 m$\mu$, for various periods of time. The relative reflectance of the films is measured after exposure, and the results are set forth in Table E.

TABLE E

| Additive (Percent based on weight of polyester) | Reflectance | | | | | |
|---|---|---|---|---|---|---|
| | Initial | 100 hrs. | 300 hrs. | 700 hrs. | 1,000 hrs. | 1,700 hrs. |
| None | 89 | 67 | 56 | 45 | 39 | 31 |
| None | 90 | 68 | 60 | 48 | 44 | 35 |
| 0.5 | 89 | 83 | 82 | 76 | 74 | 65 |
| 1.0 | 89 | 84 | 82 | 77 | 76 | 67 |

Similar films are made containing Compounds (C), (D), (E), (I), (J) and (M) of Procedure 7. Each of these films displays similar results after exposure.

Procedure 15

A series of samples is prepared from a basic formulation consisting of 95 parts of a copolymer prepared from 85% vinylidene chloride and 15% vinyl chloride, and 5 parts of acetyl triethyl citrate as a plasticizer. To all but two of the samples prepared, there is respectively added an amount of the compounds employed in Procedure 14, which is equal to 3% by weight of the copolymer. The remaining two samples are left blank for comparative purposes. Each sample is pressed into a sheet 4 mils (ca. 100 microns) thick and exposed for 300 hours to an ultraviolet light as in Procedure 7. After exposure, in each case, the film containing the compounds of this invention shows significantly less deterioration than do the control films.

Procedure 16

A high melting, highly crystalline polyethylene, having a density of 0.950, is compounded on hot rolls with 2% by weight of bis-[4-(1,1,3,3-tetramethylbutyl)phenyl]

naphthalene-1,4-dicarboxylate. The composition is compression molded into films 5 mils thick and cut into a sample 2½ x ½ inch in size. A control film is prepared in a similar manner. These films are exposed in an Atlas Weatherometer, containing twelve 20-watt fluorescent sun lamps and two carbon arcs, for a period of 500 hours. Examination of the infrared carbonyl content of each of the films indicates that the amount of degradation carbonyl in the stabilized film is far less than the amount of degradation carbonyl in the unstabilized film.

Similar results are obtained when the above dicarboxylate is replaced with an equivalent amount of other compounds of Procedure 7.

As is obvious from the above proceedures, the naphthoic acid esters contemplated herein are valuable stabilizers for polymeric materials generally. The manner in which they are incorporated into or applied to the polymer materials will depend upon the individual nature of the polymer and upon its physical form; but it is generally that which is customarily employed when the same polymers in the same physical form are contacted with prior art adjuvants. Thus, when a polymer is to be employed in coatings or impregnating agents or for the production of films, additives are usually introduced into the solutions or dispersions of the finished polymer, unless the polymer is of the thermosetting type, in which case the additives can be mixed with the prepolymer and a hardening or cross-linking agent prior to curing.

When the polymer is to be used for the preparation of fibers, the stabilizer may be introduced into the extrusion melt or into the solutions from which the fibers are formed; however, for many purposes, a treating agent is often applied to fibrous materials by immersing either the fibers or textiles made therefrom into baths containing the agent. When the polymer is to be molded, the stabilizer is usually incorporated by milling a high shear milling with the hard, finished polymer prior to molding by pressure. However, here again, the point at which the stabilizer is introduced will vary with the nature of the polymer; for example, in the case of polymers which are cross-linked or in the case of thermosetting polymers, the stabilizer is more advantageously introduced together with the cross-linking agent or with the hardening agent prior to the final molding step. When the polymer is to be employed in the production of hardened foams, the stabilizer is generally added to the mix which is to be foamed; however, in the case of the foam jet extrusion or pneumatogen injection extrusion, the stabilizer can be added just before the extrusion step. The point at which the present stabilizers are added or applied to the polymer is thus determinable by the current practices of the specific arts.

Variations or modifications of the compounds, and the quantities thereof employed in the above procedures, can be made to accommodate different requirements so long as the compound belongs to the general class of naphthoic acid esters hereinbefore defined. The same process, as illustrated in the above procedures, will be found to be satisfactory for producing additional illustrations, e.g., by employing, in the place of the specific naphthoic acid esters used in the procedures, other specific esters within the broad scope of the structural formula given at the outset of this disclosure; or by employing vinyl polymers or cellulose derivatives different from those used in the procedures, or different polymers altogether, e.g., alkyl, epoxypolyester, or polyurethane resins.

The choice and the amount of the particular naphthoic acid esters used to stabilize polymers can vary considerably depending upon many factors. Such factors include the nature of the particular polymer, the thickness of the film or other article, and the conditions of service to be encountered. Thus, in the stabilization of natural and synthetic rubber to be used in the manufacture of tires which are normally subjected to the action of sunlight, as well as exposure to the elements, the use of relatively high concentrations of the stabilizers of this invention is advantageous. The same is true of films, such as polyethylene films, which are used in outdoor applications. On the other hand, when the article of manufacture is not to be subjected to particularly severe conditions, such as in the case of molded goods which are to be used indoors, relatively low concentrations can be successfully employed. Accordingly, the amount used in a stabilizing amount determinable by a consideration of these many factors. In general, concentrations of the naphthoic acid esters of from about 0.001% to about 10% by weight of the polymer can be used. Preferably, from about 0.1% to 3% by weight of said esters, based on the weight of the polymer, is used in the compositions of this invention.

Most polymeric compositions comprise many ingredients, such as plasticizers, fillers, pigments and heat stabilizers, and the compounds of this invention can be employed in conjunction with such other ingredients without any adverse effects. Likewise, the naphthoic acid esters of this invention may be used in conjunction with other known light stabilizers. The ingredients can be intermixed by milling, blending, extruding or any of the other conventional methods which are well known to those skilled in the art.

The modified polymeric materials of this invention may be molded, extruded, calendered, spread or sprayed. Typical applications for such materials include molded, cast or extruded objects, continuous sheetings, tubing, fibers, films, wire coatings, textile coatings, laminates, paints, varnishes and enamels, wood preservatives, adhesives, and caulking compounds.

Increased amounts of the naphthoic acid esters (i.e., over and above the amount which is per se compatible with the polymer) can be incorporated into the solid polymeric alkenes, such as polyethylene, polypropylene and polyisobutylene, by using up to 10% by weight of the polymer of finely divided silica. In general, the amount of silica used is from one to two times the amount of the naphthoic acid ester which is to be incorporated in the polymer. Preferably the silica and the ester are mixed separately prior to incorporation into the polymer.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A composition comprising a polymer selected from the class consisting of natural and synthetic, linear and cross-linked polymers, and from amount 0.001% to about 10% by weight, based upon the weight of the polymer, of a compound of the formula

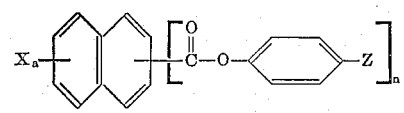

wherein:
$a$ is an integer from 0 to 2;
X is selected from the group consisting of chlorine, alkyl of 1 to 4 carbon atoms, and alkoxy of 1 to 4 carbon atoms;
Z is selected from the group consisting of α-cumyl and

where R, $R_1$ and $R_2$ are alkyl of 1 to 21 carbon atoms and the sum of $R+R_1+R_2$ is up to 23 carbon atoms; and
$n$ is an integer from 1 to 2, provided that when $n$ is 2, the carboxyl groups are on non-adjacent carbon atoms of the naphthalene nucleus.

2. The composition defined in claim 1 further characterized in that the polymer is cellulosic.

3. The composition defined in claim 1 further characterized in that the polymer is a vinyl polymer.

4. The composition defined in claim 3 further characterized in that the polymer is a vinyl halide polymer.

5. The composition defined in claim 4 further characterized in that the polymer is polyvinyl chloride.

6. The composition defined in claim 1 further characterized in that the polymer is a polyalkylene.

7. The composition defined in claim 6 further characterized in that the polymer is polyethylene.

8. The composition defined in claim 6 further characterized in that the polymer is polypropylene.

9. The composition defined in claim 1 further characterized in that the polymer is a vinyl aromatic hydrocarbon polymer.

10. The composition defined in claim 9 further characterized in that the polymer is polystyrene.

11. The composition defined in claim 1 further characterized in that the polymer is cellulose nitrate.

12. The composition defined in claim 1 further characterized in that the polymer is polyformaldehyde.

13. The composition defined in claim 1 further characterized in that the polymer is a vinyl carboxylate polymer.

14. The composition defined in claim 1 further characterized in that the polymer is polyvinyl acetate.

15. The composition defined in claim 1 further characterized in that the polymer is a cellulose ester.

16. The composition defined in claim 1 further characterized in that the polymer is a polyvinyl acetal.

17. The composition defined in claim 1 further characterized in that the polymer is a polyamide.

18. The composition defined in claim 1 further characterized in that the polymer is a polyester.

19. The composition defined in claim 1 further characterized in that the polymer is a chlorinated rubber.

20. A composition comprising a synthetic linear polymer and from about 0.001% to about 10% by weight, based upon the weight of the polymer, of a compound of the structure,

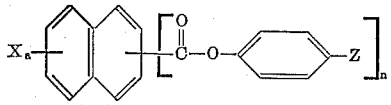

where:
$a$ is an integer from 0 to 2;
X is selected from the group consisting of chlorine, alkyl of 1 to 4 carbon atoms, and alkoxy of 1 to 4 carbon atoms;
Z is selected from the group consisting of $\alpha$-cumyl and

where R, $R_1$ and $R_2$ are alkyl of 1 to 21 carbon atoms and the sum of $R+R_1+R_2$ is up to 23 carbon atoms; and
$n$ is an integer from 1 to 2, provided that when $n$ is 2, the carboxyl groups are on non-adjacent carbon atoms of the naphthalene nucleus.

21. The composition defined in claim 20 further characterized in that the polymer is a polyalkylene.

22. The composition defined in claim 21 further characterized in that the polymer is polyethylene.

23. The composition defined in claim 21 further characterized in that the polymer is polypropylene.

24. A composition comprising a synthetic linear polymer and from about 0.001% to about 10% by weight, based upon the weight of the polymer, of a compound of the structure,

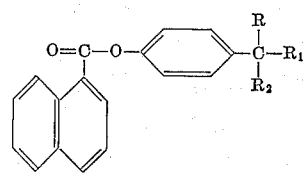

wherein R, $R_1$ and $R_2$ are alkyl of 1 to 21 carbon atoms and the sum of $R+R_1+R_2$ is up to 23 carbon atoms.

25. A composition as defined in claim 24 further characterized in that the compound is 4-nonylphenyl 1-naphthoate.

26. A composition as defined in claim 24 further characterized in that the compound is 4-t-butylphenyl 1-naphthoate.

27. A composition as defined in claim 24 further characterized in that the compound is 4-(1,1,3,3-tetramethylbutyl)phenyl 1-naphthoate.

28. A composition comprising a synthetic linear polymer and from about 0.001% to about 10% by weight, based upon the weight of the polymer, of a compound of the structure,

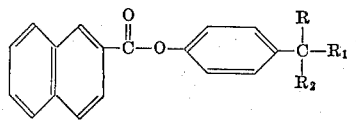

wherein R, $R_1$ and $R_2$ are alkyl of 1 to 20 carbon atoms and the sum of $R+R_1+R_2$ is up to 23 carbon atoms.

29. A composition as defined in claim 28 further characterized in that the compound is 4-nonylphenyl-2-naphthoate.

30. A composition as defined in claim 28 further characterized in that the compound is 4-t-butylphenyl 2-naphthoate.

31. A composition as defined in claim 28 further characterized in that the compound is 4-(1,1,3,3-tetramethylbutyl)phenyl 2-naphthoate.

References Cited by the Examiner

UNITED STATES PATENTS

| | | | |
|---|---|---|---|
| 2,345,006 | 3/1944 | Ross et al. | 260—45.85 |
| 2,432,517 | 12/1947 | Dreyfus | 106—108 |
| 2,583,527 | 1/1952 | Goppel et al. | 260—45.85 |

ALEXANDER H. BRODMERKEL, *Primary Examiner.*

MORRIS LIEBMAN, *Examiner.*

D. J. ARNOLD, *Assistant Examiner.*